United States Patent [19]
Morizumi

[11] Patent Number: 5,266,791
[45] Date of Patent: Nov. 30, 1993

[54] AUTOFOCUS BINOCULAR STEREOMICROSCOPE

[75] Inventor: Masaaki Morizumi, Ohmiya, Japan

[73] Assignee: Fuji Photo Optical Co., Ltd., Saitama, Japan

[21] Appl. No.: 919,966

[22] Filed: Jul. 27, 1992

[30] Foreign Application Priority Data

Oct. 17, 1991 [JP] Japan ............................ 3-269366
Oct. 17, 1991 [JP] Japan ............................ 3-269367
Oct. 17, 1991 [JP] Japan ............................ 3-269368

[51] Int. Cl.[5] ............................................ G01J 1/20
[52] U.S. Cl. ......................... 250/201.3; 250/201.6; 250/225
[58] Field of Search .... 250/201.3, 201.4, 201.6–201.8, 250/216, 234, 225, 561; 359/376–379, 368, 383; 356/1

[56] References Cited

U.S. PATENT DOCUMENTS

| | | | |
|---|---|---|---|
| 4,356,392 | 10/1982 | Wittekoek et al. | 250/201.3 |
| 4,412,127 | 10/1983 | Imai | 359/377 |
| 4,447,717 | 5/1984 | Nohda | 359/376 |
| 4,516,840 | 5/1985 | Nakahashi et al. | 250/201.3 |
| 4,737,022 | 4/1988 | Faltermeier et al. | 359/379 |
| 5,081,344 | 1/1992 | Misawa | 250/201.8 |

FOREIGN PATENT DOCUMENTS 0113014  9/1980  Japan ................... 359/377
0042611  2/1991  Japan ................... 250/201.3

Primary Examiner—David C. Nelms
Assistant Examiner—Michael Messinger
Attorney, Agent, or Firm—Brumbaugh, Graves, Donohue & Raymond

[57] ABSTRACT

A binocular stereomicroscope comprises a binocular magnifying optical system, which is composed of right and left sets of elements, an objective lens, which is located in front of the binocular magnifying optical system, and an illumination device for irradiating a light beam for illumination, which has been produced by a light source, to an object via the objective lens. Semi-transparent mirrors are respectively interposed in the right and left sets of elements of the binocular magnifying optical system. A distance measuring device is provided with detection elements, on which images of light beams separated by the semi-transparent mirrors are formed. The distance measuring device generates a distance measurement signal from the relationship between positions, at which the right and left images of the light beams separated by the semi-transparent mirrors are formed. An automatic focusing function carries out a focusing function by operating a focusing mechanism in accordance with the distance measurement signal, which is generated by the distance measuring device.

12 Claims, 11 Drawing Sheets

AUTOFOCUS BINOCULAR STEREOMICROSCOPE

BACKGROUND OF THE INVENTION

1. Field of the Invention

This invention relates to a binocular stereomicroscope for use as a microscope for surgical operations, or the like.

2. Description of the Prior Art

For example, when surgical operations are carried out on minute diseased parts, enlarged images of the diseased parts have heretofore been formed with binocular stereomicroscopes, and the diseased parts have heretofore been treated by seeing the enlarged images. Such a binocular stereomicroscope comprises an objective lens and a magnifying optical system, which substantially constitutes a binocular magnifier and which is located at the rear of the objective lens. In order to adjust the focusing point of the binocular stereomicroscope, a mechanism provided with a rack and pinion, which is formed on a stay and which vertically or horizontally moves the whole binocular stereomicroscope, has been put into practice.

Also, a binocular stereomicroscope has heretofore been known which is provided with an illumination means for illuminating an object. The illumination means is constituted such that a light beam for illumination, which has been produced by a light source, may pass through an objective lens and may then impinge upon the object.

However, the conventional binocular stereomicroscope described above is not provided with an automatic focusing function. Therefore, the operator of the binocular stereomicroscope must manually carry out a focusing operation while he views an enlarged image. Also, for example, when the binocular stereomicroscope is removed from the object during its use, visual treatment is carried out on the object, and then the binocular stereomicroscope is used again, an operation must be carried out to correct the focusing point, which has shifted accompanying the movement of the binocular stereomicroscope. The re-focusing operation is also required when the position of the object to be viewed is changed. Thus considerable time and labor are required to carry out the focusing operations.

In particular, in cases where the binocular stereomicroscope is used for a surgical operation and a state of emergency, e.g., bleeding, occurs during the surgical operation, the binocular stereomicroscope must be removed from the object, and an urgent treatment must be carried out on the object. When the surgical operation is again carried out on the object, it is necessary to carry out a re-focusing operation. Thus, movement and the focusing operation of the binocular stereomicroscope must be carried out in addition to the treatment on the diseased part. Therefore, there is the risk that the surgical operation cannot be carried out quickly.

In order to eliminate the problems described above, it is considered to utilize a mechanism provided with a special frame and a storage means such that, after a binocular stereomicroscope is removed from the position of observation, the binocular stereomicroscope can again be returned to the same focusing position with respect to the position of observation. However, in cases where the binocular stereomicroscope is provided with such a mechanism, a large-sized mechanism is required to adjust the position of the whole binocular stereomicroscope, which is heavy, in accordance with a predetermined focusing point. Therefore, the binocular stereomicroscope cannot be operated smoothly, and its cost cannot be kept low.

SUMMARY OF THE INVENTION

The primary object of the present invention is to provide a binocular stereomicroscope, which is provided with an automatic focusing function and in which a distance measuring means for carrying out the automatic focusing operation is positioned compactly.

Another object of the present invention is to provide a binocular stereomicroscope, which is provided with an automatic focusing function and in which a light projecting means for distance measurement and a distance measuring means for carrying out the automatic focusing operation are positioned compactly such that they do not adversely affect a binocular magnifying optical system and an illumination means.

The specific object of the present invention is to provide a binocular stereomicroscope, which is provided with an automatic focusing function and in which, even if an object surface causes specular reflection, distance measurement can be carried out accurately.

The present invention provides a first binocular stereomicroscope comprising:

i) a binocular magnifying optical system, which is composed of right and left sets of elements, ii) an objective lens, which is located in front of the binocular magnifying optical system, and iii) an illumination means for irradiating a light beam for illumination, which has been produced by a light source, to an object via the objective lens, wherein the improvement comprises the provision of:

a) semi-transparent mirrors, each of which is interposed in one of said right and left sets of elements of said binocular magnifying optical system, b) a distance measuring means provided with detection elements, on which images of light beams separated by said semi-transparent mirrors are formed, said distance measuring means generating a distance measurement signal from the relationship between positions, at which the right and left images of said light beams separated by said semi-transparent mirrors are formed, and c) an automatic focusing function for operating a focusing mechanism in accordance with said distance measurement signal, which is generated by said distance measuring means, and thereby carrying out a focusing pperation.

With the first binocular stereomicroscope in accordance with the present invention, the light beam for illumination is projected from the illumination means onto the object. A light beam for image observation passes through the objective lens and the right and left sets of elements of the binocular magnifying optical system and thereafter impinges upon the eyepieces. In this manner, an enlarged image can be seen by the operator. Also, parts of the light beam for image observation are separated from the light beam for image observation by the semi-transparent mirrors, which are interposed in the right and left sets of elements of the binocular magnifying optical system. Images of the light beams thus separated are formed on the right and left detection elements of the distance measuring means. The amount of deviation of the position of the object along the optical axis direction is found by the distance measuring means from the relationship between the positions, at which the right and left images of the light beams separated by the semi-transparent mirrors are formed. The distance measuring means generates a signal representing the amount of deviation of the position of the object along the optical axis direction. The focusing mechanism is operated in accordance with the signal, and the automatic focusing operation is thereby carried out.

Also, with the first binocular stereomicroscope in accordance with the present invention, the automatic focusing function having good operability can be incorporated compactly in the binocular stereomicroscope. Additionally, because the first binocular stereomicroscope in accordance with the present invention is provided with the automatic focusing function, when the binocular stereomicroscope is moved and the object distance changes during surgical operations, or the like, manual focusing operations need not be carried out. Therefore, the operator can always see a sharp enlarged image and give close attention to treatment of the object. Accordingly, the first binocular stereomicroscope in accordance with the present invention is very advantageous in practice as a microscope for surgical operations, or the like.

The present invention also provides a second binocular stereomicroscope comprising:

i) an objective lens having a large aperture, ii) a binocular magnifying optical system, which leads to right and left eyepieces and which is associated with sides rightward and leftward from a center part of the objective lens, and iii) an illuminating optical system for irradiating a light beam for illumination, which has been produced by a light source, to an object via the objective lens, wherein the improvement comprises:

a) locating said illuminating optical system on the side forward or rearward from said binocular magnifying optical system with respect to said objective lens, b) locating a distance measurement light projecting means between right and left sets of elements of said binocular magnifying optical system, said distance measurement light projecting means projecting a light beam for distance measurement and forming a spot image on said object, c) locating a distance measuring means on the side opposite to said illuminating optical system, said distance measuring means being of an active type, with which the amount of deviation of the position of said spot image along the optical axis direction is found from a position, at which said spot image is re-formed, and d) providing an automatic focusing function for operating a focusing mechanism in accordance with a signal, which is obtained from said distance measuring means, and thereby carrying out a focusing operation.

With the second binocular stereomicroscope in accordance with the present invention, the light beam for illumination is projected from the illumination means onto the object. A light beam for image observation passes through the objective lens and the right and left sets of elements of the binocular magnifying optical system and thereafter impinges upon the eyepieces. In this manner, an enlarged image can be seen by the operator. Also, the light beam for distance measurement, which has been produced by the distance measurement light projecting means, travels from the position between right and left sets of elements of the binocular magnifying optical system, passes through the objective lens, and then impinges upon the object. The spot image of the light beam for distance measurement is thus formed at a position on the object, which position lies on the optical axis of the objective lens. Thereafter, the spot image passes through the objective lens and is re-formed by the active type of distance measuring means. With the distance measuring means, the amount of deviation of the position of the spot image is found from the position, at which the spot image is re-formed. The signal representing the amount of deviation of the position of the spot image is generated by the distance measuring means. The focusing mechanism is operated in accordance with the signal, and the automatic focusing operation is thereby carried out.

Also, with the second binocular stereomicroscope in accordance with the present invention, the optical axis of the light beam for distance measurement, which has been produced by the distance measurement light projecting means, is coaxial with the optical axis of the objective lens. The spot image of the light beam for distance measurement is projected perpendicularly to the object. The position of the spot image is always at the middle of the binocular stereoscopic vision image. Therefore, no parallax occurs between the object and the position of detection for distance measurement. Additionally, the distance measuring means for receiving the spot image and detecting it by the active type of method is located at a free area which does not interfere with the binocular magnifying optical system and the illumination means. In this manner, the automatic focusing function having good operability is positioned compactly such that it may not adversely affect the amount of light in the other functions. Because the second binocular stereomicroscope in accordance with the present invention is provided with the automatic focusing function, when the binocular stereomicroscope is moved and the object distance changes during surgical operations, or the like, manual focusing operations need not be carried out. Therefore, the operator can always see a sharp enlarged image and give close attention to treatment of the object. Accordingly, the second binocular stereomicroscope in accordance with the present invention is very advantageous in practice as a microscope for surgical operations, or the like.

The present invention further provides a third binocular stereomicroscope comprising:

i) a binocular magnifying optical system, ii) an objective lens, which is located in front of the binocular magnifying optical system, and iii) an illumination means for irradiating a light beam for illumination, which has been produced by a light source, to an object via the objective lens, wherein the improvement comprises the provision of:

a) a distance measurement light projecting means for irradiating a light beam for distance measurement onto said object, b) a distance measuring means, with which a distance measurement signal corresponding to deviation of the position of said object is generated from said light beam for distance measurement, which has been irradiated by said distance measurement light projecting means, c) a focusing mechanism, which is operated in accordance with said distance measurement signal, which has been generated by said distance measuring means, d) a polarizing filter, which is interposed in said distance measurement light projecting means, and e) a polarizing filter, which is interposed in said distance measuring means.

The third binocular stereomicroscope in accordance with the present invention solves the problems described below. Specifically, as a mechanism for imparting an automatic focusing function to a binocular stereomicroscope, a light beam for distance measurement may be irradiated to an object, a distance measuring means may be utilized, with which a distance measurement signal related to the position of the object with respect to the optical axis direction is generated from the light beam for distance measurement, and a focusing mechanism may be operated in accordance with the distance measurement signal in order to carry out a focusing operation automatically. In such cases, if the surface of the object is the one which causes direct reflection, there will be the risk that errors occur in the distance measurement.

More specifically, by way of example, in cases where a binocular stereomicroscope is used for medical purposes, the surface of the object is often covered with a liquid and is rendered specular. In such cases, the light beam for distance measurement, which is projected onto the surface of the object, is directly reflected by the liquid surface. If the distance measurement is carried out with the reflected light beam, the problem occurs in that a distance different from the actual object distance from the surface of the object is measured, and therefore the automatic focusing function does not work normally. How errors in distance measurement occur will be described hereinbelow for the phase difference detecting type of distance measuring means and the active type of distance measuring means.

With the phase difference detecting type of distance measuring means, a target image is projected from a target projecting system onto an object. The target image is re-formed by a distance measurement objective lens of the distance measuring means. Thereafter, the re-formed image is again re-formed as two images on a detection element by a pair of lenses. The position of the target image, i.e., the position of the surface of the object, is detected from the distance (pitch) between the two images formed on the detection element. The distance measuring means is designed such that the target image projected from the target projecting system may be formed in the vicinity of a set reference position with respect to the position of the object. Therefore, the point of image formation of the target image and the position of the surface of the object do not necessarily coincide with each other. However, ordinarily, surfaces of objects are rough. In addition, the target projecting optical system is designed such that the depth at the point of image formation may be deep. Therefore, even if the target image formed on the object is slightly unsharp, it has a sufficient contrast ratio to enable a calculation from the two images formed on the detection element. Accordingly, an accurate distance measurement can be carried out.

However, in cases where the surface of the object is covered with a liquid, the target image is subjected to specular reflection from the surface of the object. Instead of the target image, which is projected onto the surface of the object and is slightly unsharp, being re-formed, the light beam reflected in the manner described above impinges upon the optical system of the distance measuring means and is re-formed on the detection element. Therefore, when the point of image formation of the target image is regarded as the position of the surface of the object, and the length of the optical path up to the point of image formation of the target image is calculated, an error in distance measurement occurs, which error corresponds to the distance between the the point of image formation of the target image and the surface of the object along the optical axis direction. As a result, the focusing position deviates from the correct focusing position.

With the active type of distance measuring means, a light beam for distance measurement is projected from the distance measurement light projecting means onto the object, and a spot image of the light beam for distance measurement is formed at the position on the object, which position lies on the optical axis of the objective lens. The spot image is re-formed on a detection element by a lens of the distance measuring system. The amount of deviation of the position of the spot image along the optical axis direction is found from the position, at which the spot image is re-formed. A distance measurement signal thus obtained is fed out of the distance measuring means.

However, in cases where the surface of the object is wetted with a liquid and is slippery, the projected light beam forming the spot image is subjected to specular reflection from the surface of the object. The light beam reflected from the surface of the object impinges upon the optical system of the distance measuring means, and the image of the reflected light beam is formed on the detection element. In this manner, the spot image on the surface of the object is not reformed. The position of the spot of the reflected light beam on the detection element shifts in accordance with the inclination of the reflecting surface. Therefore, a calculation for distance measurement is carried out on a position different from the surface of the object, and the focusing position deviates from the correct focusing position.

The third binocular stereomicroscope in accordance with the present invention eliminates the problems described above. With the third binocular stereomicroscope in accordance with the present invention, the light beam for illumination is projected from the illumination means onto the object. A light beam for image observation passes through the objective lens and the right and left sets of elements of the binocular magnifying optical system and thereafter impinges upon the eyepieces. In this manner, an enlarged image can be seen by the operator. Also, the light beam for distance measurement is projected from the distance measurement light projecting means onto the object. The image formed on the surface of the object by the light beam for distance measurement is re-formed on the detection element by the optical system of the distance measuring means. The distance measurement signal is obtained in accordance with the image re-formed on the detection element. The focusing mechanism is operated in accordance with the distance measurement signal, and the automatic focusing operation is thereby carried out.

Also, with the third binocular stereomicroscope in accordance with the present invention, polarizing filters are respectively interposed in the distance measurement light projecting means and the distance measuring means. Therefore, even if specular reflection occurs at the surface of the object as in cases where the surface of the object is wetted with a liquid, it is possible to eliminate the problem in that the light beam for distance measurement, which has been produced by the distance measurement light projecting means, is reflected by the surface of the object, and the reflected light beam directly enters the optical system of the distance measuring means and forms an image on the detection element. In this manner, errors in distance measurement due to adverse effects of direct reflection from the surface of the object can be eliminated, and the automatic focusing operation can be carried out based on accurate distance measurement. Also, the automatic focusing function having good operability can be positioned compactly. Because the third binocular stereomicroscope in accordance with the present invention is provided with the automatic focusing function, when the binocular stereomicroscope is moved and the object distance changes during surgical operations, or the like, manual focusing operations need not be carried out. Therefore, the operator can always see a sharp enlarged image and give close attention to treatment of the object. Accordingly, the third binocular stereomicroscope in accordance with the present invention is very advantageous in practice as a microscope for surgical operations, or the like.

DESCRIPTION OF THE PREFERRED EMBODIMENTS

The present invention will hereinbelow be described in further detail with reference to the accompanying drawings.

Figure 1:
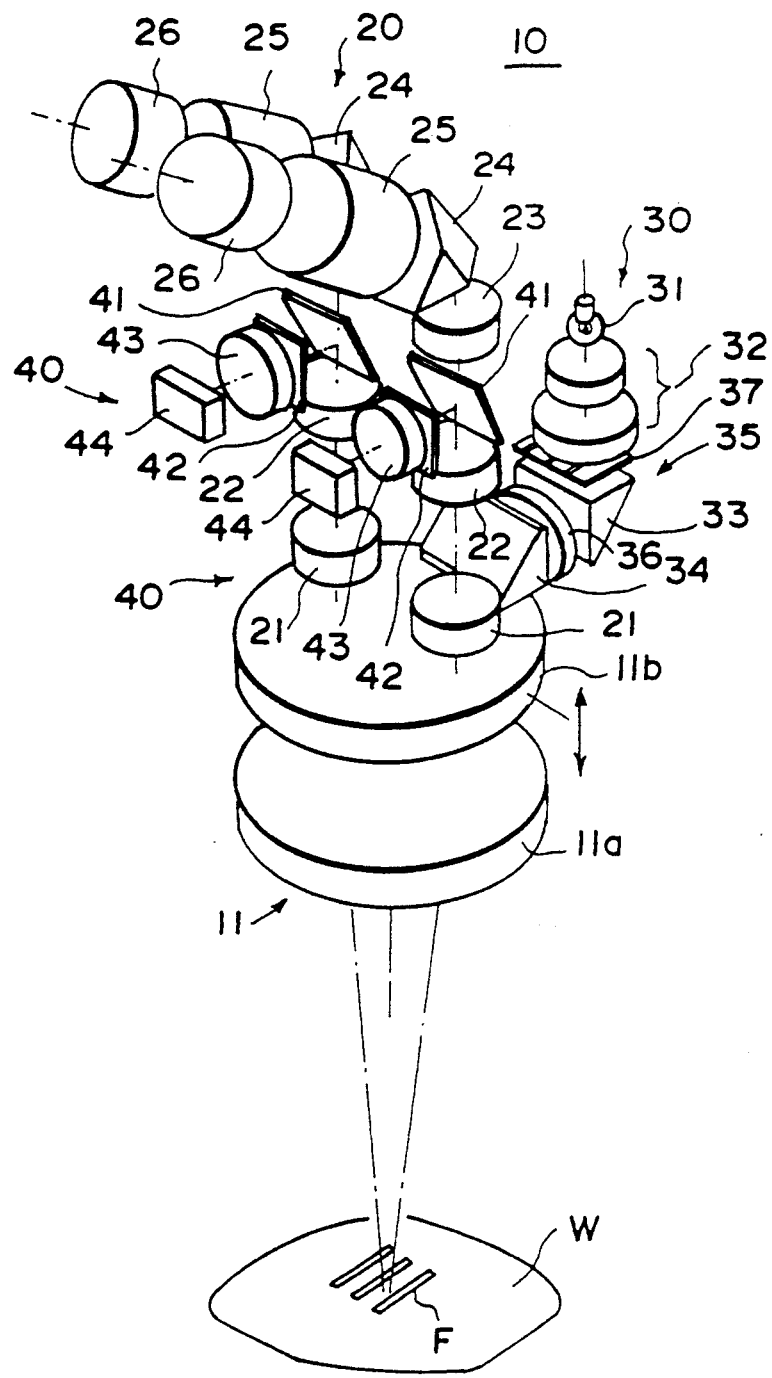
FIG. 1 is a schematic view showing an internal optical mechanism in a first embodiment of the binocular stereomicroscope in accordance with the present invention.

FIG. 1 is a schematic view showing an internal optical mechanism in a first embodiment of the binocular stereomicroscope in accordance with the present invention.

A binocular stereomicroscope 10 comprises a binocular magnifying optical system 20, an illumination means 30, and a distance measuring means 40, which are accommodated in an enclosed housing (not shown). An objective lens (unit) 11 having a large aperture is located facing an object W.

Figure 2:
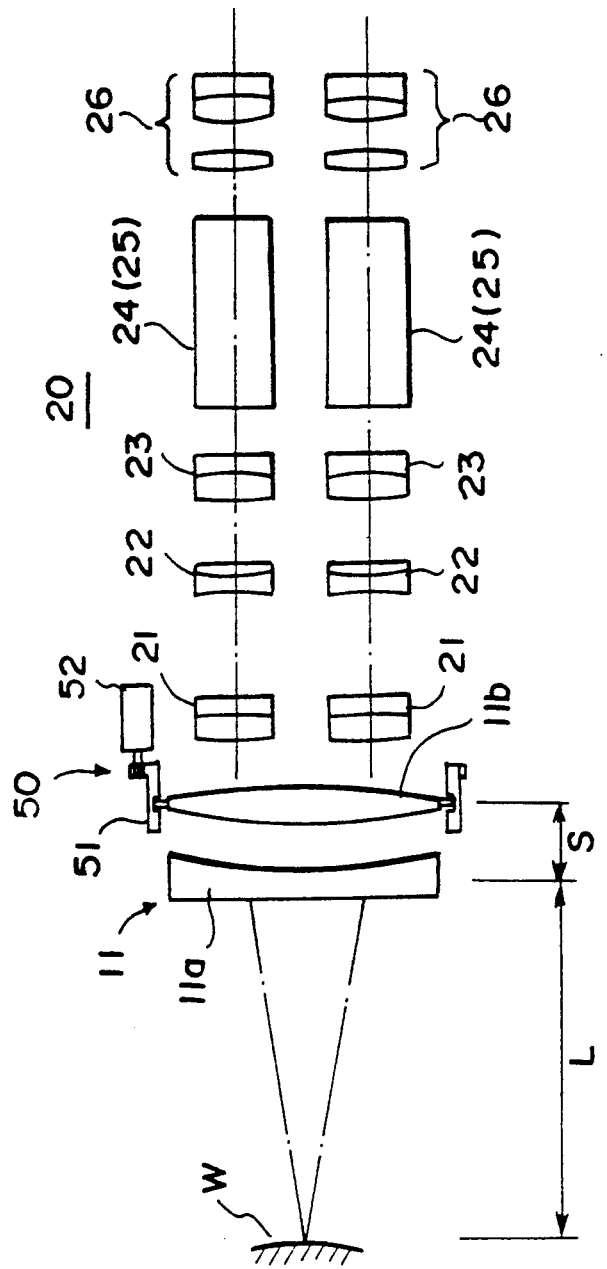
FIG. 2 is a schematic view showing a binocular magnifying optical system in the first embodiment of FIG. 1.

As illustrated also in FIG. 2, the objective lens 11 is constituted of a stationary objective lens 11a, which exhibits characteristics of a negative lens system (a concave lens) as a whole, and a movable objective lens 11b, which is located at the rear of the stationary objective lens 11a and exhibits characteristics of a positive lens system (a convex lens) as a whole. The movable objective lens 11b can be moved along the optical axis direction by a focusing mechanism 50, which will be described later.

The binocular magnifying optical system 20 comprises right and left sets of elements for forming an enlarged image of the object W, which are located at the rear of the objective lens 11 (i.e., above the objective lens 11 in FIG. 1). The two sets of elements of the binocular magnifying optical system 20 are respectively located on the sides rightward and leftward from the center part of the objective lens 11. As illustrated also in FIG. 2, each of the right and left sets of elements of the binocular magnifying optical system 20 comprises a first zoom lens group 21, a second zoom lens group 22, a relay lens group 23, a first prism member 24, a second prism member 25, and an eyepiece (unit) 26, which are located in this order from the side of the objective lens 11. A semi-transparent mirror 41 for separating a light beam towards the distance measuring means 40 is interposed between each second zoom lens group 22 and each relay lens group 23.

The binocular magnifying optical system 20 serving as a fundamental structure of the binocular stereomicroscope 10 is constituted such that the objective lens 11 may be located in front of the binocular telescopic optical system ranging from the right and left first zoom lens groups 21, 21 to the eyepieces 26, 26, and the binocular stereomicroscope may be focused at a finite distance (i.e., a focusing distance L). An erect image is obtained by the effects of the first prism members 24, 24 and the second prism members 25, 25. The focusing distance L can be changed by moving the movable objective lens 11b of the objective lens 11 such that the binocular stereomicroscope may be focused at the position of the object W.

Figure 3:
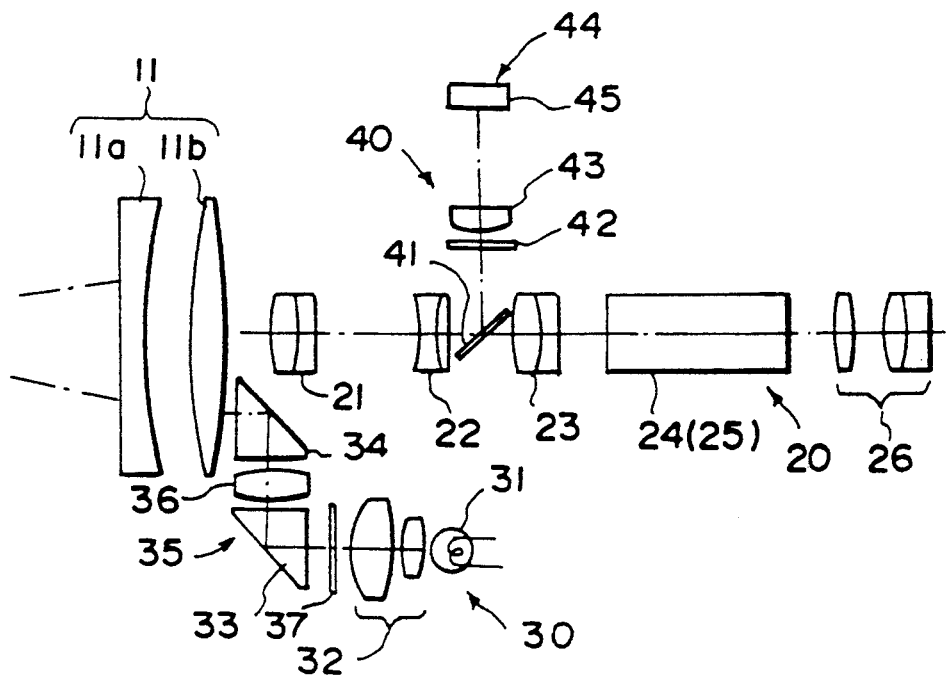
FIG. 3 is a schematic view showing a distance measuring means and an illuminating optical system in the first embodiment of FIG. 1.

The illumination means 30 is located on the side forward from the binocular magnifying optical system 20 with respect to the objective lens 11. As illustrated also in FIG. 3, the illumination means 30 has an illuminating optical system 35. The illuminating optical system 35 is constituted of the light source (lamp) 31, the condensing lens group 32, a stripe filter 37, rectangular prisms 33 and 34, and a relay lens 36. The light source 31, the condensing lens group 32, the stripe filter 37, and the rectangular prism 33 are arrayed approximately parallel to the optical axis of the objective lens 11. The illumination means 30 irradiates a light beam to the object W via the objective lens 11.

The stripe filter 37 is provided with a striped pattern, which completely transmits visible light and does not transmit light (infrared light or ultraviolet light) having specific wavelengths close to the visible wavelength region. Specifically, the striped pattern is constituted of parts for reflecting light having specific wavelengths and parts for transmitting light having the specific wavelengths. The two types of parts are located alternately to form an unequally spaced pattern such that a projected stripe image F appropriate as a target image for distance measurement can be obtained on the object W.

The stripe image F, which has been formed by the stripe filter 37, is re-formed on the object W by the illuminating optical system 35 and the objective lens 11. Specifically, the light beam, which has been produced by the light source 31, passes through the condensing lens group 32 and then impinges upon the stripe filter 37. Visible light completely passes through the stripe filter 37, but light having specific wavelengths close to the visible wavelength region is reflected by or passes through the stripe filter 37 in accordance with the striped pattern. The light beam, which has passed through the stripe filter 37, passes through the rectangular prisms 33 and 34, the relay lens 36, and the objective lens 11 and thereafter impinges upon the object W. The condensing lens group 32 forms an image of the filament image of the light source 31 at a point in the vicinity of the pupil of the relay lens 36. The condensing lens group 32 is constituted such that the distribution of the amount of light on the stripe filter 37 may be uniform and nonuniformity may not occur in the amount of light even after the light beam has passed through the relay lens 36 and the objective lens 11. The stripe image F is re-formed on the object W by the relay lens 36 and the objective lens 11.

The distance measuring means 40 is located on the side rearward from the binocular magnifying optical system 20 with respect to the objective lens 11 such that light beams may be separated from intermediate parts of the binocular magnifying optical system 20 and utilized for distance measurement. As illustrated also in FIG. 3, the distance measuring means 40 has a distance measuring optical system. The distance measuring optical system comprises two sets of elements corresponding to the light beams separated by the right and left semi-transparent mirrors 41, 41. Specifically, the distance measuring optical system comprises visible light cutting filters 42, 42, distance measurement relay lenses 43, 43, and detection modules 44, 44, which are located in this order from the side of the semi-transparent mirrors 41, 41. Each detection module 44 incorporates a detection element 45 and takes on the form of a unit. The detection modules 44, 44 detect the amount of deviation of the position of the stripe image F, which is formed by the illumination means 30, along the optical axis direction. The visible light cutting filters 42, 42 block visible light and transmit only the stripe image F, which is formed by the light having the specific wavelengths, towards the detection elements 45, 45. Additionally, the detection elements 45, 45 have the characteristics capable of detecting the image formed by the light having the specific wavelengths.

Figure 4:
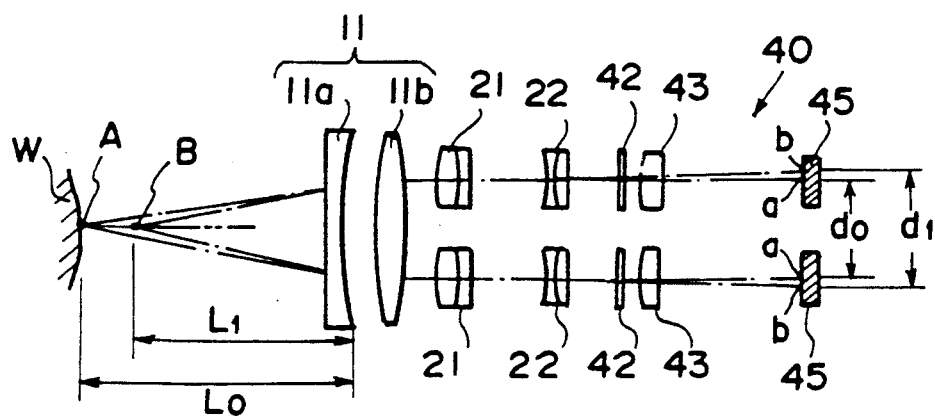
FIG. 4 is an explanatory view showing how the distance measuring means carries out distance measurement in the first embodiment of FIG. 1.

In the distance measuring means 40, the stripe image F for distance measurement, which has come from the object W and has passed through the objective lens 11, passes through the right and left first zoom lens groups 21, 21 and the second zoom lens groups 22, 22 of the binocular magnifying optical system 20. Thereafter, the stripe image F is separated by the right and left semi-transparent mirrors 41, 41 and is re-formed on the detection elements 45, 45 by the distance measurement relay lenses 43, 43. Distance measurement is carried out in the manner described below. Specifically, as illustrated in FIG. 4, the stripe image F, which has been projected by the illumination means 30, is formed on the object W, which is present at a point A (an object distance L0). The stripe image F passes through the distance measurement relay lenses 43, 43. Thereafter, two images are re-formed at points a, a on the right and left detection elements 45, 45 of the detection modules 44, 44. The distance between the points a and a, i.e., the pitch d0, is found as the relationship between the positions, at which the two images are formed. In cases where the object W is present at a point B (an object distance L1), the stripe image F is re-formed as two images at points b, b on the right and left detection elements 45, 45 by the distance measurement relay lenses 43, 43. The distance between the points b and b, i.e., the pitch d1, is found as the relationship between the positions, at which the two images are formed. The pitches d0 and d1 correspond to the information about the position of the object W. From the amount of change of the pitch d1 with respect to the pitch d0, the amount of movement, L0−L1, of the object W with respect to the object distance L0 can be calculated. The focusing mechanism 50 is operated in accordance with the distance measurement signal, which has been obtained in this manner, and the automatic focusing operation can thereby be carried out. A sharp contrast can be obtained with the stripe image F, and therefore the detection accuracy can be kept high.

As simply exemplified in FIG. 2, the focusing mechanism 50 may be constituted of a known mechanism such that the movable objective lens 11b of the objective lens 11 can be moved along the optical axis direction as a cam cylinder 51 rotates, and the cam cylinder 51 may be rotated by a motor 52. A distance measurement signal is obtained from a calculation process carried out on signals, which are obtained from the detection modules 44, 44. A drive signal for changing the focusing position in accordance with the distance measurement signal is fed into the motor 52 of the focusing mechanism 50, and the binocular stereomicroscope is thereby automatically focused on the object W.

An example of how long the focusing distance changes with respect to the amount of movement of the movable objective lens 11b in the focusing mechanism 50 will be described hereinbelow. By way of example, the focal length f1 of the stationary objective lens 11a is −350 mm, and the focal length f2 of the movable objective lens 11b is 150 mm. In FIG. 2, when the center distance S between the stationary objective lens 11a and the movable objective lens 11b is changed within the range of 2 mm to 15 mm, the focusing distance L from the center point of the stationary objective lens 11a to the object W changes within the range of 256 mm to 220 mm. Specifically, when the movable objective lens 11b is moved by a distance of 13 mm, the focusing zone is 36 mm. By the movement of the movable objective lens 11b, the automatic focusing operation can be carried out for the object W, which is located in the focusing zone.

With the first embodiment described above, the distance measuring means 40 is utilized which separates light beams from the intermediate parts of the binocular magnifying optical system 20 in order to enable the automatic focusing operation. Therefore, the distance measuring means 40 can be compactly incorporated in the binocular stereomicroscope 10. Also, with the first embodiment described above, the focusing mechanism 50 is provided which moves part of the objective lens 11. Therefore, the binocular stereomicroscope 10, which is provided with the automatic focusing function capable of quickly carrying out the focusing operation, can be kept compact. Moreover, addition of the mechanism for projecting the stripe image and the automatic focusing function to a binocular stereomicroscope having a conventional structure can be carried out by slightly changing the structure.

Additionally, the distance measuring optical system is located at the rear of the objective lens 11. Therefore, even if the objective lens 11 is replaced by a new one and the total magnification of the binocular stereomicroscope 10 is thereby changed, the distance measuring function is not affected by the replacement of the objective lens 11, and the automatic focusing function can be obtained by connecting the focusing mechanism 50 to the new objective lens 11.

Furthermore, with the first embodiment described above, the object W is uniformly illuminated with visible light by the action of the illumination means 30. At the same time, the stripe image F, which is formed by invisible light (infrared light or ultraviolet light) having specific wavelengths close to the visible wavelength region, is projected onto the object W. Even if the contrast of the object image is low as in the cases of images of surfaces of the internal organs, or the like, reliable distance measurement can be carried out in accordance with the stripe image F, and a quick automatic focusing function can be obtained. Also, the stripe image F for distance measurement is invisible. Additionally, even if a single light source is utilized for the illumination with visible light and for the formation of the stripe image, no loss in the amount of light occurs, and no adverse effects occur on the observation of the enlarged image. Therefore, the binocular stereomicroscope can be kept low in cost and compact in size.

In the first embodiment described above, the focusing mechanism 50 for moving part of the objective lens 11 is utilized, and the focusing operation is carried out by changing the focal length of the lens system in accordance with the signal generated by the distance measuring means 40. Alternatively, as the focusing mechanism, a drive means may be utilized which moves the whole binocular stereomicroscope along the optical axis direction, the drive means may be operated such that the position of the object W may coincide with the position of the focal length of the objective lens 11, and the automatic focusing operation may thereby be carried out.

A second embodiment of the binocular stereomicroscope in accordance with the present invention will be described hereinbelow.

Figure 5:
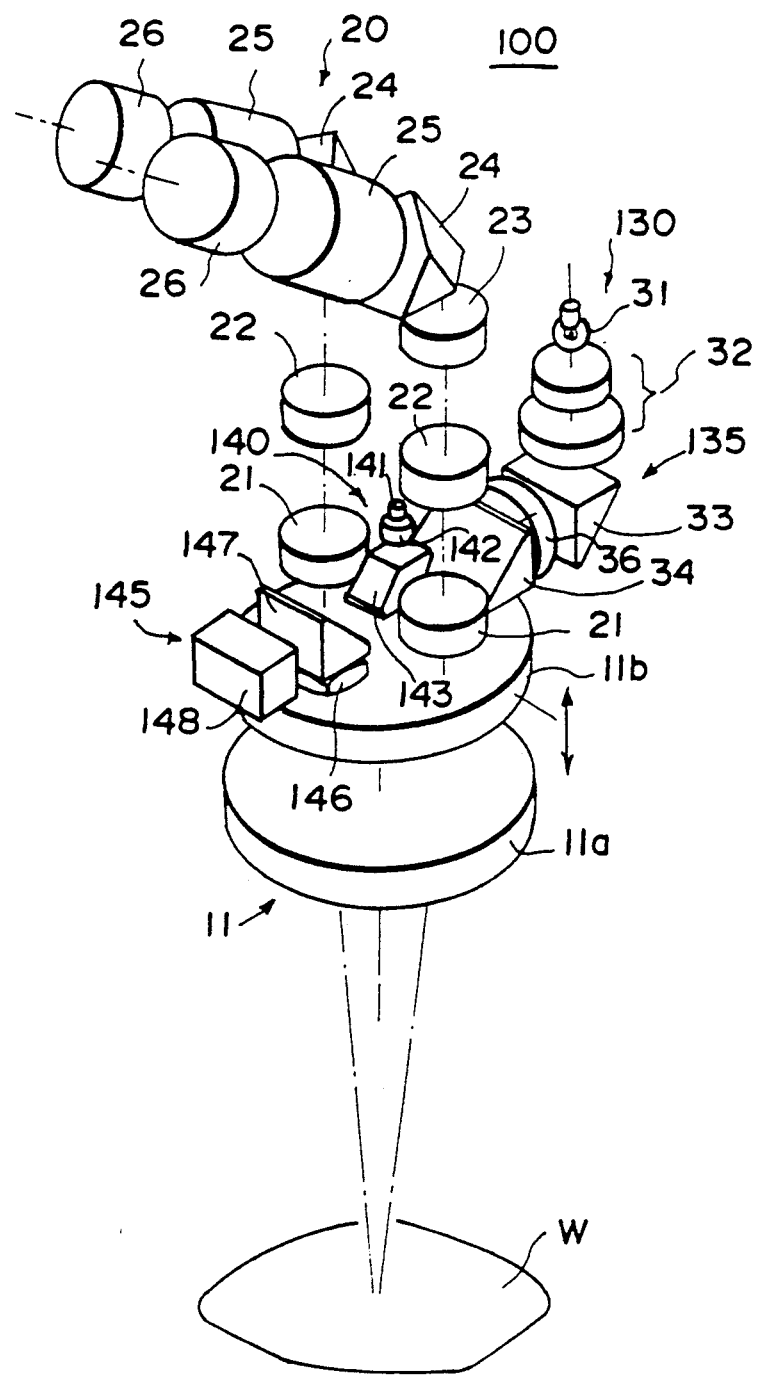
FIG. 5 is a schematic view showing an internal optical mechanism in a second embodiment of the binocular stereomicroscope in accordance with the present invention.

FIG. 5 is a schematic view showing an internal optical mechanism in the second embodiment of the binocular stereomicroscope in accordance with the present invention. In FIG. 5, similar elements are numbered with the same reference numerals with respect to FIG. 1.

A binocular stereomicroscope 100 comprises the binocular magnifying optical system 20, an illumination means 130, a distance measurement light projecting means 140, and a distance measuring means 145, which are accommodated in an enclosed housing (not shown). The objective lens (unit) 11 having a large aperture is located facing the object W. The objective lens (unit) 11 and the binocular magnifying optical system 20 are constituted in the same manners as those in the first embodiment of FIG. 1. (However, in the second embodiment, the semi-transparent mirrors 41, 41 in the first embodiment of FIG. 1 are not interposed between the second zoom lens groups 22, 22 and the relay lens groups 23, 23.)

Figure 7:
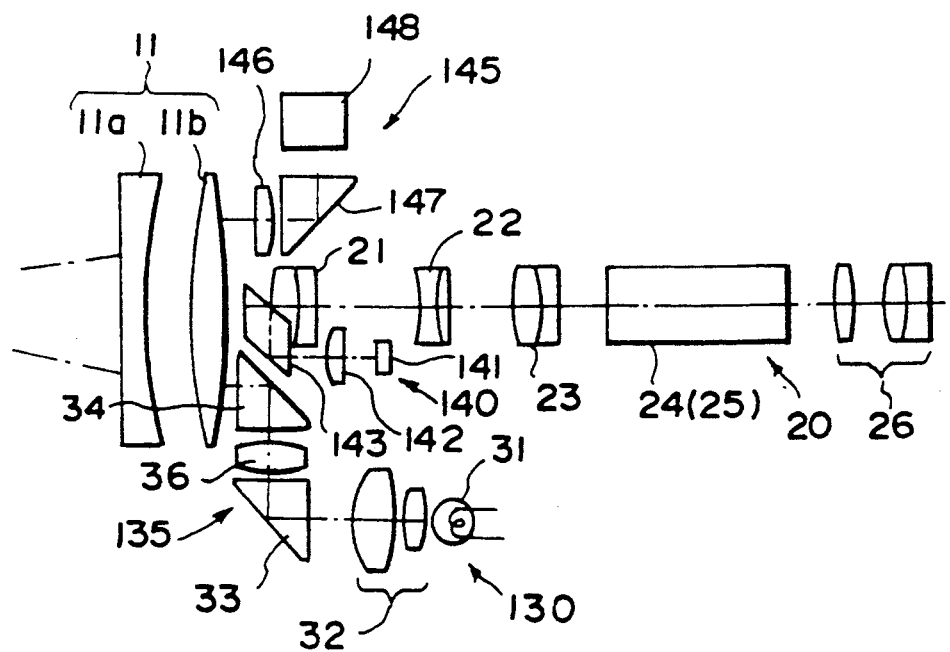
FIG. 7 is a schematic view showing a distance measurement light projecting means, a distance measuring means, and an illuminating optical system in the second embodiment of FIG. 5.

The illumination means 130 is located on the side forward from the binocular magnifying optical system 20 with respect to the objective lens 11. As illustrated also in FIG. 7, the illumination means 130 has an illuminating optical system 135. The illuminating optical system 135 is constituted of the light source (lamp) 31, the condensing lens group 32, rectangular prisms 33 and 34, and a relay lens 36. The light source 31, the condensing lens group 32, and the rectangular prism 33 are arrayed approximately parallel to the optical axis of the objective lens 11. The illumination means 130 irradiates a light beam to the object W via the objective lens 11.

The distance measurement light projecting means 140 is located between the right and left sets of elements of the binocular magnifying optical system 20. As illustrated also in FIG. 7, the distance measurement light projecting means 140 comprises a light projecting LED (light emitting diode) 141 for producing an infrared light beam, a light projecting lens 142, and a light projecting prism 143. The infrared light beam produced by the light projecting LED 141 is projected from the position coaxial with the center point of the optical axis of the objective lens 11 onto the object W. A spot image of the infrared light beam is thereby formed on the object W.

The distance measuring means 145, which is of the active type, is located on the side opposite to the illumination means 130 (i.e., on the side rearward from the binocular magnifying optical system 20 with respect to the objective lens 11). As illustrated also in FIG. 7, the distance measuring means 145 has a distance measuring optical system. The distance measuring optical system comprises a distance measurement lens 146, a distance measurement prism 147, and a detection module 148, which are located in this order from the side of the objective lens 11. The detection module 148 incorporates a detection element 149 (shown in FIG. 8) and takes on the form of a unit. The detection module 148 detects the amount of deviation of the position of the spot image, which is formed by the distance measurement light projecting means 140, along the optical axis direction.

Figure 8:
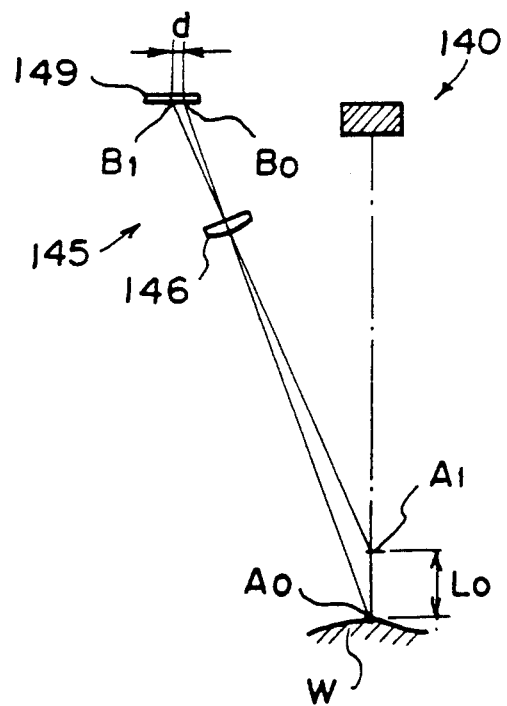
FIG. 8 is an explanatory view showing how an active type of distance measuring means carried out distance measurement in the second embodiment of FIG. 5.

Distance measurement by the distance measuring means 145 is carried out in the manner described below. Specifically, as illustrated in FIG. 8, the spot image, which has been projected by the distance measurement light projecting means 140, is formed on the object W, which is present at a point A0. The spot image passes through the distance measurement lens 146 and is re-formed at a point B0 on the detection element 149 of the detection module 148. In cases where the object W is present at a point A1, the spot image is re-formed at a point B1 on the detection element 149 by the distance measurement lens 146. Specifically, when the position of the object W shifts a distance L0 from the point A0 to the point A1, the position of the image re-formation on the detection element 149 shifts by an amount of displacement, d, from the point B0 to the point B1. The position of the object W is calculated from the amount of displacement, d, of the position of the image re-formation. The focusing mechanism 50 is operated in accordance with the calculated position of the object W, and the automatic focusing operation is thereby carried out.

The focusing mechanism 50 is constituted in the same manner as that in the first embodiment of FIG. 1. A distance measurement signal is obtained from a calculation process carried out on a signal, which is obtained from the detection element 149 of the detection module 148. A drive signal for changing the focusing position in accordance with the distance measurement signal is fed into the motor 52 of the focusing mechanism 50 (shown in FIG. 2), and the binocular stereomicroscope is thereby automatically focused on the object W.

Figure 6:
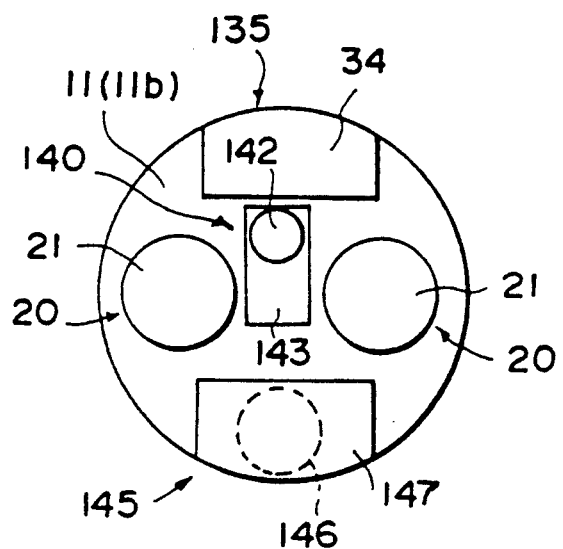
FIG. 6 is a schematic view showing the arrangement of optical systems with respect to an objective lens in the second embodiment of FIG. 5.

FIG. 6 is a plan view showing the arrangement of the optical systems with respect to the objective lens 11. With respect to the objective lens 11 having a large aperture, the right and left first zoom lens groups 21, 21 having a small aperture in the binocular magnifying optical system 20 are located on the sides rightward and leftward from the center part of the objective lens 11. The rectangular prism 34 of the illuminating optical system 135 is located on the side forward from the binocular magnifying optical system 20 and at the middle between the right and left first zoom lens groups 21, 21. The distance measurement lens 146 (the distance measurement prism 147) of the optical system of the distance measuring means 145 is located on the side rearward from the binocular magnifying optical system 20 and at the middle between the right and left first zoom lens groups 21, 21. Also, the light projecting prism 143 of the distance measurement light projecting means 140 is located between the right and left first zoom lens groups 21, 21 of the binocular magnifying optical system 20. The center point of the light beam projected by the light projecting prism 143 coincides with the center point of the objective lens 11.

Alternatively, the distance measuring means 145 may be located on the side forward from the binocular magnifying optical system 20, and the illuminating optical system 135 may be located on the side rearward from the binocular magnifying optical system 20.

With the second embodiment described above, the space and the optical path at the objective lens 11, which are not used for the binocular magnifying optical system 20, are utilized efficiently. The illuminating optical system 135 of the illumination means 130, the optical system of the distance measurement light projecting means 140, and the optical system of the distance measuring means 145 are located in such a free space. The active type of distance measuring means 145 is located at the place which has not heretofore been utilized. Also, the focusing mechanism 50 is provided which moves part of the objective lens 11. Therefore, the binocular stereomicroscope 100, which is provided with the automatic focusing function capable of quickly carrying out the focusing operation, can be kept compact. Additionally, the optical systems do not interfere with one another and do not separate the light beam. Therefore, no loss occurs in the amount of light of the enlarged image and in the amount of the illuminating light beam. As a result, image observation, illumination, and distance measurement can be carried out appropriately. Moreover, addition of the automatic focusing function to a binocular stereomicroscope having a conventional structure can be carried out by slightly changing the structure.

Additionally, the distance measuring optical system is located at the rear of the objective lens 11. Therefore, even if the objective lens 11 is replaced by a new one and the total magnification of the binocular stereomicroscope 100 is thereby changed, the distance measuring function is not affected by the replacement of the objective lens 11, and the automatic focusing function can be obtained by connecting the focusing mechanism 50 to the new objective lens 11.

In the second embodiment described above, the focusing mechanism 50 for moving part of the objective lens 11 is utilized, and the focusing operation is carried out by changing the focal length of the lens system in accordance with the signal generated by the distance measuring means 145. Alternatively, as the focusing mechanism, a drive means may be utilized which moves the whole binocular stereomicroscope along the optical axis direction, the drive means may be operated such that the position of the object W may coincide with the position of the focal length of the objective lens 11, and the automatic focusing operation may thereby be carried out.

A third embodiment of the binocular stereomicroscope in accordance with the present invention will be described hereinbelow.

Figure 9:
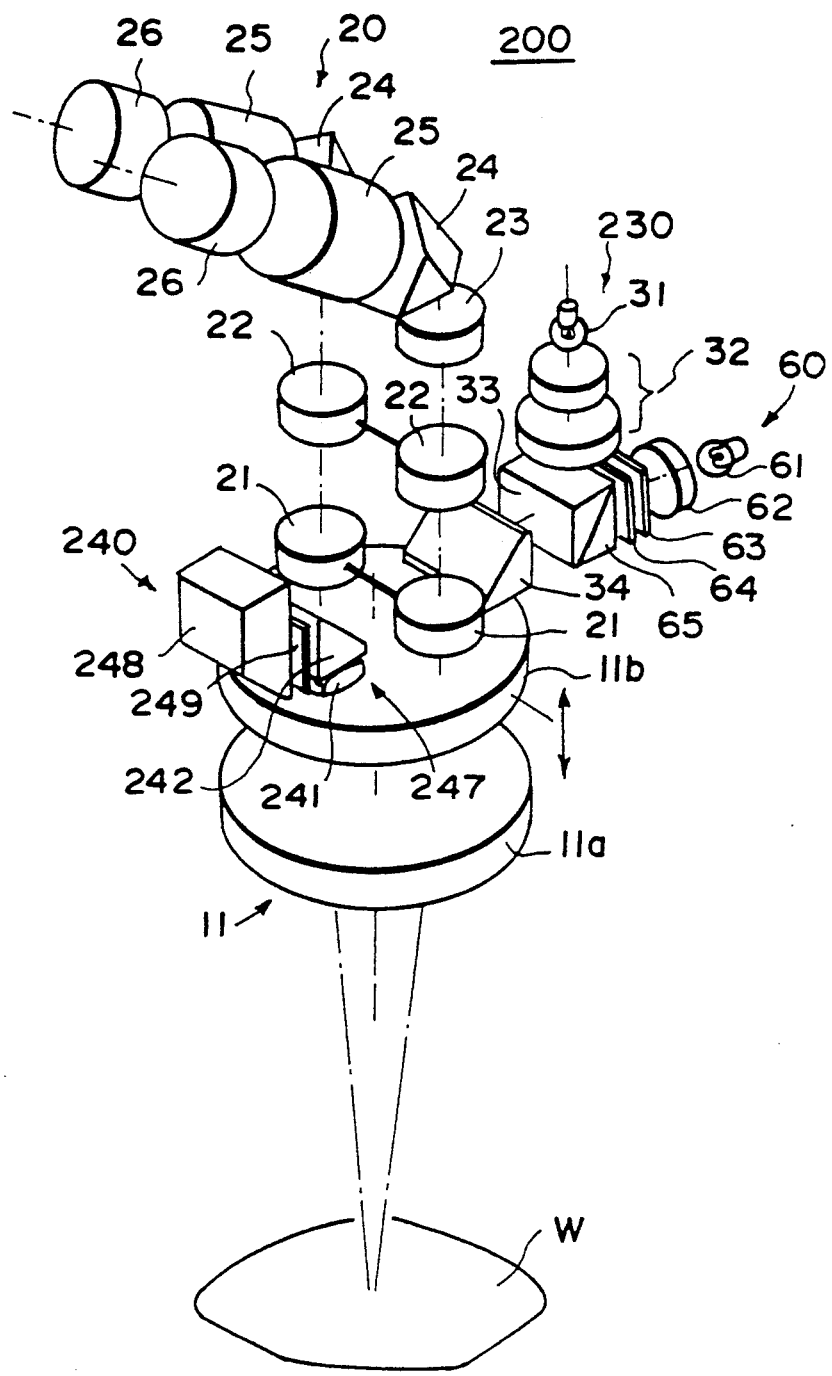
FIG. 9 is a schematic view showing an internal optical mechanism in a third embodiment of the binocular stereomicroscope in accordance with the present invention.

FIG. 9 is a schematic view showing an internal optical mechanism in the third embodiment of the binocular stereomicroscope in accordance with the present invention, which is provided with a split image difference detecting type of distance measuring means. In FIG. 9, similar elements are numbered with the same reference numerals with respect to FIG. 1.

A binocular stereomicroscope 200 comprises the binocular magnifying optical system 20, an illumination means 230, a distance measuring means 240, and a distance measurement light projecting means 60, which are accommodated in an enclosed housing (not shown). The objective lens (unit) 11 having a large aperture is located facing the object W. The objective lens (unit) 11 and the binocular magnifying optical system 20 are constituted in the same manners as those in the first embodiment of FIG. 1. (However, in the third embodiment, the semi-transparent mirrors 41, 41 in the first embodiment of FIG. 1 are not interposed between the second zoom lens groups 22, 22 and the relay lens groups 23, 23.)

The illumination means 230 is located on the side forward from the binocular magnifying optical system 20 with respect to the objective lens 11. As illustrated also in FIG. 11, the illumination means 230 has an illuminating optical system. The illuminating optical system is constituted of the light source (lamp) 31, the condensing lens group 32, and rectangular prisms 33 and 34. The light source 31, the condensing lens group 32, and the rectangular prism 33 are arrayed approximately parallel to the optical axis of the objective lens 11. The illumination means 230 irradiates a light beam to the object W via the objective lens 11.

The distance measurement light projecting means 60 is located together with the illumination means 230. As illustrated also in FIG. 11, the distance measurement light projecting means 60 comprises a light source 61, a light projecting lens 62, a chart plate 63, a polarizing filter 64, and a prism 65, which are located in this order. A target image, which is formed by the chart plate 63, is irradiated to the rectangular prism 33 of the illumination means 230 from its back. The target image and the light beam for illumination are together projected onto the surface of the object W.

Figure 11:
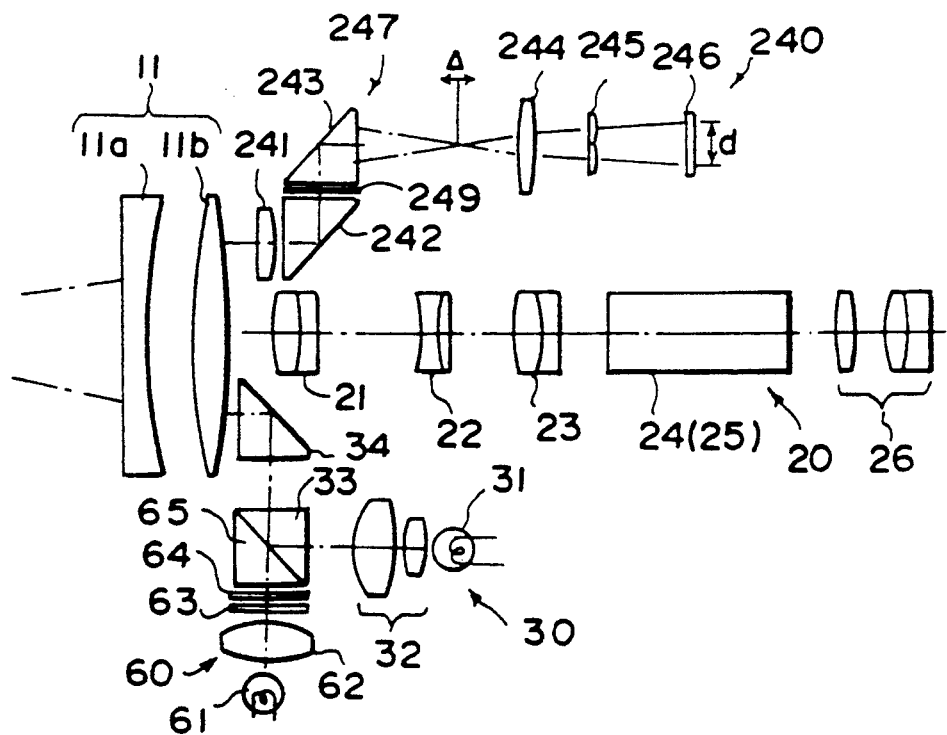
FIG. 11 is a schematic view showing a distance measuring optical system and an illuminating optical system in the third embodiment of FIG. 9.

The distance measuring means 240, which is of the split image difference detecting type, is located on the side opposite to the illumination means 230 (i.e., on the side rearward from the binocular magnifying optical system 20 with respect to the objective lens 11). As illustrated in FIG. 11, the distance measuring means 240 has a distance measuring optical system 247. The distance measuring optical system 247 comprises a distance measurement objective lens 241, distance measurement prisms 242 and 243, a field lens 244, a separator lens 245, and a detection element 246 (a line sensor), which are located in this order from the side of the objective lens 11. The detection element 246, the separator lens 245, the field lens 244, and the distance measurement prism 243 are combined into a unit as a detection module 48 shown in FIG. 9. Also, a polarizing filter 249 is interposed between the distance measurement prisms 242 and 243.

In the distance measuring optical system 247, the target image, which has been formed on the object W and has passed through the objective lens 11, passes through the distance measurement objective lens 241, the prisms 42 and 243, and the polarizing filter 249. An image is thus formed in the vicinity of the field lens 244. The image thus formed passes through the field lens 244 and is separated into two parts by the separator lens 245. Images are thus re-formed at two positions on the detection element 246. The distance d (pitch) between the two images re-formed on the detection element 246 changes in accordance with a deviation (the amount of deviation Δ) of the position of image formation of the image, which is formed in the vicinity of the field lens 244, from the focusing position. The amount of deviation Δ is calculated from the distance d. The focusing mechanism 50 is operated such that the amount of deviation Δ may fall within a predetermined range, and an automatic focusing operation is thereby carried out.

Also, the polarizing filter 64 is interposed in the distance measurement light projecting means 60 in order to polarize the light beam carrying the target image. Additionally, the polarizing filter 249 is interposed in the distance measuring means 240. Therefore, even if the surface of the object W is specular, and the target image is directly reflected by the specular surface of the object W, an image of the reflected light beam can be prevented from being formed on the detection element 246. In this manner, errors in distance measurement due to the directly reflected light beam are prevented from occurring.

In the distance measuring optical system 247, the distance measurement prisms 242 and 243 are not essential optically and need not necessarily be employed in cases where the position for the provision of the field lens 244, the separator lens 245, the detection element 246, and the polarizing filter 249 is available.

The focusing mechanism 50 is constituted in the same manner as that in the first embodiment of FIG. 1. A distance measurement signal is obtained from a calculation process carried out on a signal, which is obtained from the detection element 246 of the detection module 248. A drive signal for changing the focusing position in accordance with the distance measurement signal is fed into the motor 52 of the focusing mechanism 50 (shown in FIG. 2), and the binocular stereomicroscope is thereby automatically focused on the object W.

Figure 10:
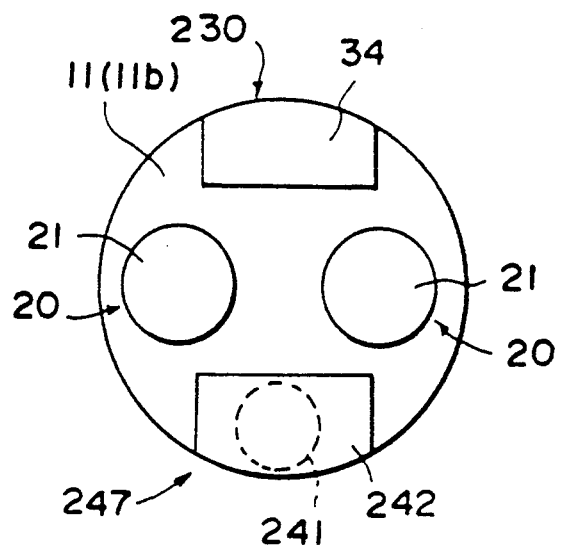
FIG. 10 is a schematic view showing the arrangement of optical systems with respect to an objective lens in the third embodiment of FIG. 9.

FIG. 10 is a plan view showing the arrangement of the optical systems with respect to the objective lens 11. With respect to the objective lens 11 having a large aperture, the right and left first zoom lens groups 21, 21 having a small aperture in the binocular magnifying optical system 20 are located on the sides rightward and leftward from the center part of the objective lens 11. The rectangular prism 34 of the illumination means 230 is located on the side forward from the binocular magnifying optical system 20 and at the middle between the right and left first zoom lens groups 21, 21. The distance measurement objective lens 241 (the distance measurement prism 242) of the distance measuring optical system 247 is located on the side rearward from the binocular magnifying optical system 20 and at the middle between the right and left first zoom lens groups 21, 21. Alternatively, the distance measuring optical system 247 may be located on the side forward from the binocular magnifying optical system 20, and the illuminating optical system may be located on the side rearward from the binocular magnifying optical system 20.

With the third embodiment described above, the polarizing filters 64 and 249 are respectively interposed in the distance measurement light projecting means 60 and the distance measuring means 240. Therefore, it is possible to eliminate errors in distance measurement due to direct reflection of the target image from the surface of the object W. Accordingly, distance measurement can be carried out accurately, and an accurate automatic focusing function can be obtained.

Also, with the third embodiment described above, the space and the optical path at the objective lens 11, which are not used for the binocular magnifying optical system 20, are utilized efficiently. The optical system of the illumination means 230, the optical system of the distance measurement light projecting means 60, and the distance measuring optical system 247 of the distance measuring means 240 are located in such a free space. The phase difference detecting type of distance measuring means 240, which can measure the distance with a light beam other than the center light beam, is located at the place which has not heretofore been utilized. Also, the focusing mechanism 50 is provided which moves part of the objective lens 11. Therefore, the binocular stereomicroscope 200, which is provided with the automatic focusing function capable of quickly carrying out the focusing operation, can be kept compact. Additionally, addition of the automatic focusing function to a binocular stereomicroscope having a conventional structure can be carried out by slightly changing the structure.

Additionally, the distance measuring optical system 247 is located at the rear of the objective lens 11. Therefore, even if the objective lens 11 is replaced by a new one and the total magnification of the binocular stereomicroscope 200 is thereby changed, the distance measuring function is not affected by the replacement of the objective lens 11, and the automatic focusing function can be obtained by connecting the focusing mechanism 50 to the new objective lens 11.

A fourth embodiment of the binocular stereomicroscope in accordance with the present invention will be described hereinbelow.

Figure 12:
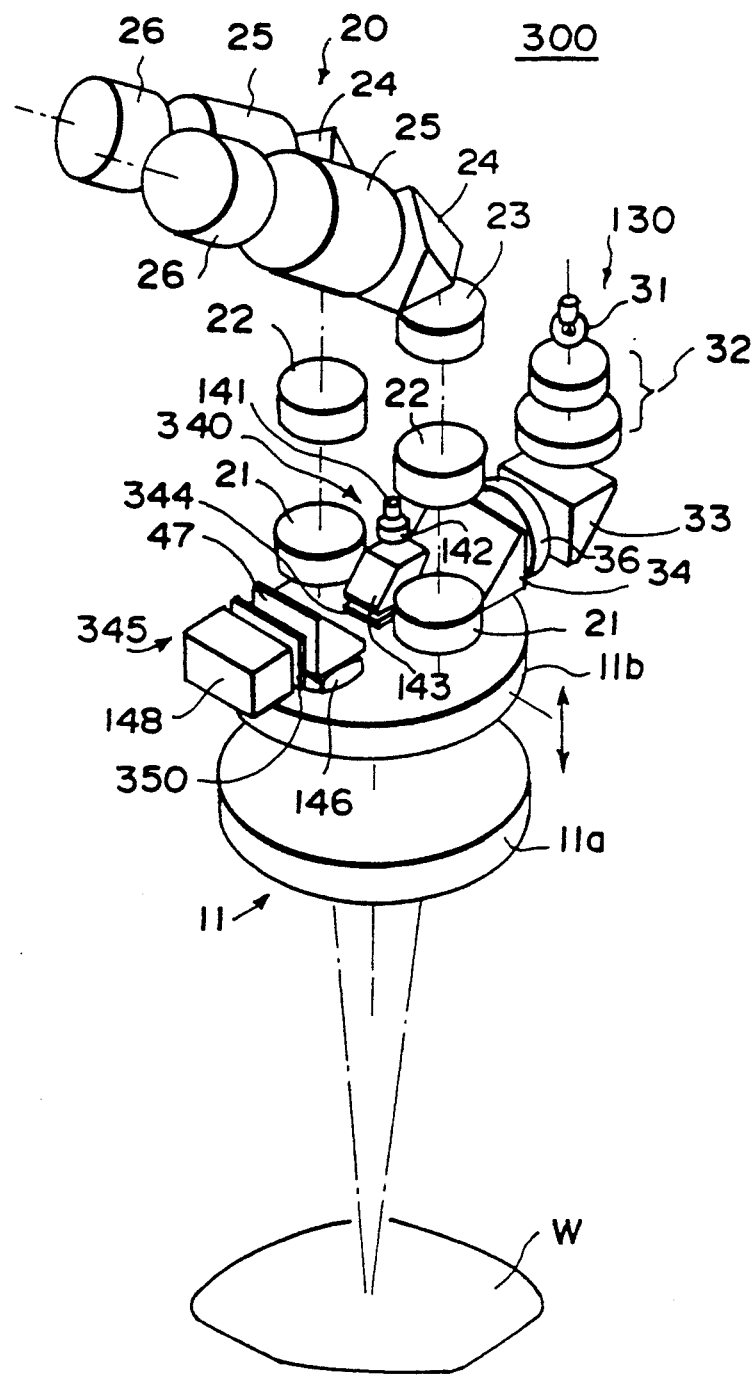
FIG. 12 is a schematic view showing an internal optical mechanism in a fourth embodiment of the binocular stereomicroscope in accordance with the present invention.

FIG. 12 is a schematic view showing an internal optical mechanism in the fourth embodiment of the binocular stereomicroscope in accordance with the present invention, which is provided with an active type of distance measuring means In FIG. 12, similar elements are numbered with the same reference numerals with respect to FIGS. 1 and 5.

A binocular stereomicroscope 300 comprises the binocular magnifying optical system 20, the illumination means 130, a distance measurement light projecting means 340, and a distance measuring means 345, which are accommodated in an enclosed housing (not shown). The objective lens 11 is located facing the object W. The objective lens 11 and the binocular magnifying optical system 20 are constituted in the same manners as those in the first embodiment of FIG. 1. (However, in the fourth embodiment, the semi-transparent mirrors 41, 41 in the first embodiment of FIG. 1 are not interposed between the second zoom lens groups 22, 22 and the relay lens groups 23, 23.) The illumination means 130 is constituted in the same manner as that in the second embodiment of FIG. 5.

Figure 14:
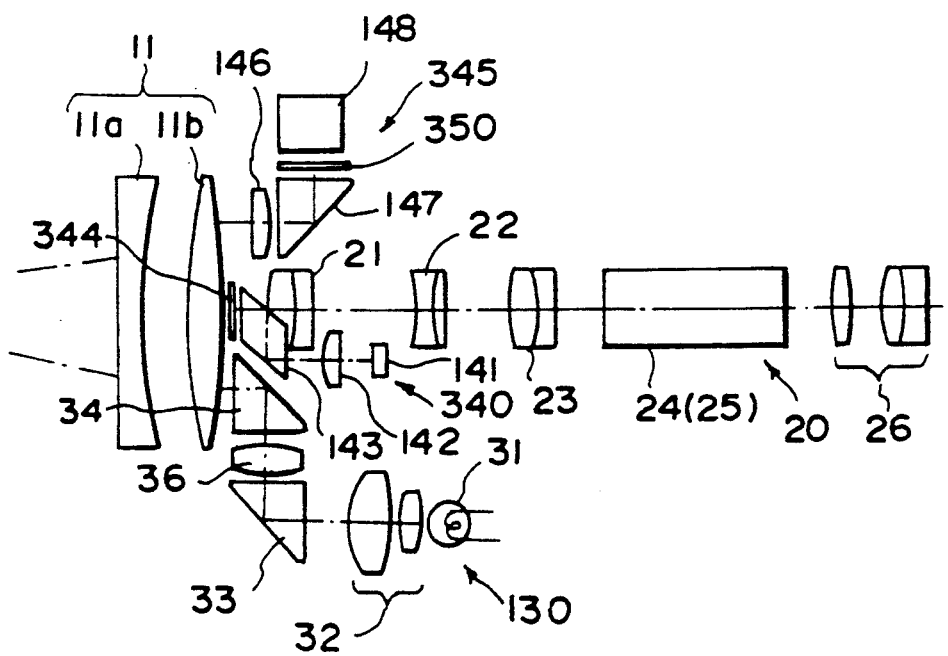
FIG. 14 is a schematic view showing a distance measurement light projecting means, a distance measuring means, and an illuminating optical system in the fourth embodiment of FIG. 12.

The distance measurement light projecting means 340 is located between the right and left sets of elements of the binocular magnifying optical system 20 As illustrated also in FIG. 14, the distance measurement light projecting means 340 comprises the light projecting LED (light emitting diode) 141 for producing an infrared light beam, the light projecting lens 142, the light projecting prism 143, and a polarizing filter 344. The infrared light beam produced by the light projecting LED 141 is projected from the position coaxial with the center point of the optical axis of the objective lens 11 onto the object W. A spot image of the infrared light beam is thereby formed on the object W.

The distance measuring means 345, which is of the active type, is located on the side opposite to the illumination means 130 (i.e., on the side rearward from the binocular magnifying optical system 20 with respect to the objective lens 11). As illustrated also in FIG. 14, the distance measuring means 345 has a distance measuring optical system. The distance measuring optical system comprises the distance measurement lens 146, the distance measurement prism 147, a polarizing filter 350, and the detection module 148, which are located in this order from the side of the objective lens 11. The detection module 148 incorporates the detection element 149 (shown in FIG. 15) and takes on the form of a unit. The detection module 148 detects the amount of deviation of the position of the spot image, which is formed by the distance measurement light projecting means 340, along the optical axis direction.

Figure 15:
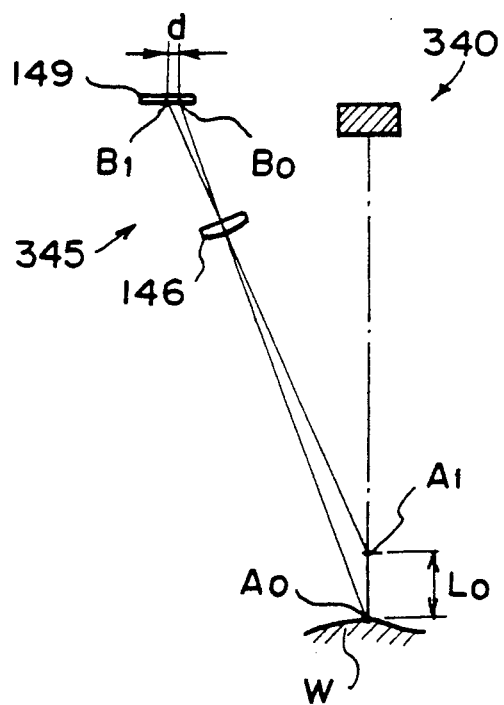
FIG. 15 is an explanatory view showing how an active type of distance measuring means carried out distance measurement in the fourth embodiment of FIG. 12.

Distance measurement by the distance measuring means 345 is carried out in the manner described below. Specifically, as illustrated in FIG. 15, the spot image, which has been projected by the distance measurement light projecting means 340, is formed on the object W, which is present at a point A0. The spot image passes through the distance measurement lens 146 and is re-formed at a point B0 on the detection element 149 of the detection module 148. In cases where the object W is present at a point A1, the spot image is re-formed at a point B1 on the detection element 149 by the distance measurement lens 146. Specifically, when the position of the object W shifts a distance L0 from the point A0 to the point A1, the position of the image re-formation on the detection element 149 shifts by an amount of displacement, d, from the point B0 to the point B1. The position of the object W is calculated from the amount of displacement, d, of the position of the image re-formation. The focusing mechanism 50 is operated in accordance with the calculated position of the object W, and the automatic focusing operation is thereby carried out.

Also, the polarizing filter 344 is interposed in the distance measurement light projecting means 340 in order to polarize the light beam carrying the spot image. Additionally, the polarizing filter 350 is interposed in the distance measuring means 345. Therefore, even if the surface of the object W is specular, and the spot image is directly reflected by the specular surface of the object W, an image of the reflected light beam can be prevented from being formed on the detection element 149. In this manner, errors in distance measurement, which are caused to occur by the directly reflected light beam and which correspond to the inclination of the surface of the object W, are prevented from occurring.

Figure 13:
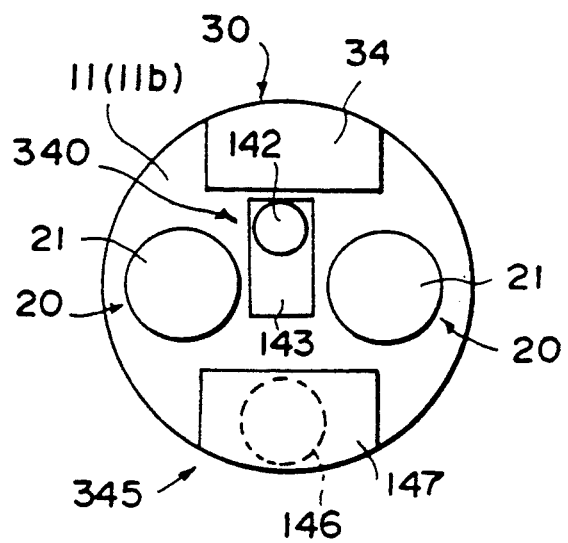
FIG. 13 is a schematic view showing the arrangement of optical systems with respect to an objective lens in the fourth embodiment of FIG. 12.

The focusing mechanism 50 is constituted in the same manner as that in the first embodiment of FIG. 1. FIG. 13 is a plan view showing the arrangement of the optical systems with respect to the objective lens 11. With respect to the objective lens 11, the right and left first zoom lens groups 21, 21 in the binocular magnifying optical system 20 are located on the sides rightward and leftward from the center part of the objective lens 11. The rectangular prism 34 of the illumination means 130 is located on the side forward from the right and left first zoom lens groups 21, 21. The distance measurement lens 146 (the distance measurement prism 147) of the optical system of the distance measuring means 345 is located on the side rearward from the binocular magnifying optical system 20 and at the middle between the right and left first zoom lens groups 21, 21. Also, the light projecting prism 143 of the distance measurement light projecting means 340 is located between the right and left first zoom lens groups 21, 21 of the binocular magnifying optical system 20. The center point of the light beam projected by the light projecting prism 143 coincides with the center point of the objective lens 11.

With the fourth embodiment described above, the polarizing filters 344 and 350 are respectively interposed in the distance measurement light projecting means 340 and the distance measuring means 345. Therefore, it is possible to eliminate errors in distance measurement due to direct reflection of the spot image from the surface of the object W. Accordingly, distance measurement can be carried out accurately, and an accurate automatic focusing function can be obtained. Also, the optical axis of the light beam, which has been produced by the distance measurement light projecting means 340, is coaxial with the optical axis of the objective lens 11. The spot image is projected perpendicularly to the object W. The position of the spot image is always at the middle of the binocular stereoscopic vision image. Therefore, no parallax occurs between the object W and the position of detection for distance measurement.

In the third and fourth embodiments described above, the focusing mechanism 50 for moving part of the objective lens 11 is utilized, and the focusing operation is carried out by changing the focal length of the lens system in accordance with the signal generated by the distance measuring means 240 or 345. Alternatively, as the focusing mechanism, a drive means may be utilized which moves the whole binocular stereomicroscope along the optical axis direction, the drive means may be operated such that the position of the object W may coincide with the position of the focal length of the objective lens 11, and the automatic focusing operation may thereby be carried out.

The binocular stereomicroscope in accordance with the present invention is applicable to surgical operations, other medical purposes, experiments, and the like.

What is claimed is:

1. A binocular stereomicroscope comprising:
   i) a binocular magnifying optical system, which is composed of right and left sets of elements,
   ii) an objective lens, which is located in front of the binocular magnifying optical system, and
   iii) an illumination means for irradiating a light beam for illumination, which has been produced by a light source, to an object via the objective lens,
   wherein the improvement comprises the provision of:
   a) semi-transparent mirrors, each of which is interposed in one of said right and left sets of elements of said binocular magnifying optical system,
   b) a distance measuring means provided with detection elements, on which images of light beams separated by said semi-transparent mirrors are formed, said distance measuring means generating a distance measurement signal from the relationship between positions, at which the right and left images of said light beams separated by said semi-transparent mirrors are formed, and
   c) an automatic focusing function for operating a focusing mechanism in accordance with said distance measurement signal, which is generated by said distance measuring means, and thereby carrying out a focusing operation.

2. A binocular stereomicroscope as defined in claim 1 wherein said objective lens is composed of a stationary objective lens and a movable objective lens, and said focusing operation is carried out by movement of said movable objective lens.

3. A binocular stereomicroscope as defined in claim 2 wherein said movable objective lens is located on the side inward from said stationary objective lens.

4. A binocular stereomicroscope as defined in claim 1 wherein a stripe filter provided with a striped pattern is incorporated in an illuminating optical system of said illumination means, said striped pattern transmitting visible light and not transmitting light having specific wavelengths close to a visible wavelength region, whereby a visible light beam is irradiated to said object, and at the same time a stripe image formed by said stripe filter is projected onto said object, and visible light cutting filters are interposed in said distance measuring means, said visible light cutting filters transmitting said stripe image formed by the light having said specific wavelengths.

5. A binocular stereomicroscope comprising:
   i) an objective lens having a large aperture and having an optical axis,
   ii) a binocular magnifying optical system, which leads to right and left eyepieces and which is associated with sides rightward and leftward from a center part of the objective lens, and
   iii) an illuminating optical system for irradiating a light beam for illumination, which has been produced by a light source, to an object via the objective lens,
   wherein the improvement comprises:
   a) locating said illuminating optical system on the side forward or rearward from said binocular magnifying optical system with respect to said objective lens,
   b) locating a distance measurement light projecting means centrally between right and left sets of elements of said binocular magnifying optical system, said distance measurement light projecting means projecting a light beam for distance measurement and forming a spot image on said object,
   c) locating a distance measuring means on the side opposite to said illuminating optical system, said distance measuring means being of an active type, with which the amount of deviation of the position of said spot image along the optical axis direction is found from a position, at which said spot image is re-formed, and
   d) providing an automatic focusing function for operating a focusing mechanism in accordance with a signal, which is obtained from said distance measuring means, and thereby carrying out a focusing operation.

6. A binocular stereomicroscope as defined in claim 5 wherein said objective lens is composed of a stationary objective lens and a movable objective lens, and said focusing operation is carried out by movement of said movable objective lens.

7. A binocular stereomicroscope as defined in claim 6 wherein said movable objective lens is located on the side inward from said stationary objective lens.

8. A binocular stereomicroscope comprising:
   i) a binocular magnifying optical system,
   ii) an objective lens, which is located in front of the binocular magnifying optical system, and
   iii) an illumination means for irradiating a light beam for illumination, which has been produced by a light source, to an object via the objective lens,
   wherein the improvement comprises the provision of:
   a) a distance measurement light projecting means for irradiating a light beam for distance measurement onto said object,
   b) a distance measuring means, with which a distance measurement signal corresponding to deviation of the position of said object is generated from said light beam for distance measurement, which has been irradiated by said distance measurement light projecting means,
   c) a focusing mechanism, which is operated in accordance with said distance measurement signal, which has been generated by said distance measuring means,
   d) a polarizing filter, which is interposed in said distance measurement light projecting means, and
   e) a polarizing filter, which is interposed in said distance measuring means.

9. A binocular stereomicroscope as defined in claim 8 wherein, said distance measuring means is of the split image difference detecting type.

10. A binocular stereomicroscope as defined in claim 8 wherein said distance measuring means is of the active type.

11. A binocular stereomicroscope as defined in claim 8 wherein said objective lens is composed of a stationary objective lens and a movable objective lens, and said focusing operation is carried out by movement of said movable objective lens.

12. A binocular stereomicroscope as defined in claim 11 wherein said movable objective lens is located on the side inward from said stationary objective lens.

* * * * *